United States Patent [19]

Era et al.

[11] Patent Number: 4,653,866
[45] Date of Patent: Mar. 31, 1987

[54] LIQUID CRYSTAL COMPOUND AND LIQUID CRYSTAL COMPOSITION INCLUDING THE SAME

[75] Inventors: Susumu Era; Hisao Yokokura, both of Hitachi; Kishiro Iwasaki, Hitachiota; Tadao Nakata; Teruo Kitamura, both of Katsuta; Akio Mukoh, Mito, all of Japan

[73] Assignee: Hitachi, Ltd., Tokyo, Japan

[21] Appl. No.: 735,608

[22] Filed: May 20, 1985

[30] Foreign Application Priority Data

May 21, 1984 [JP] Japan ................................. 59-102214
May 22, 1984 [JP] Japan ................................. 59-101674

[51] Int. Cl.$^4$ .................... C09K 19/06; C09K 19/12; C07C 153/00; C07C 154/00; G02F 1/13
[52] U.S. Cl. .......................... 350/350 S; 252/299.64; 252/299.65; 252/299.66; 252/299.67; 252/299.6; 252/299.5; 350/351; 558/257
[58] Field of Search ............ 252/299.64, 299.65, 252/299.66, 299.67, 299.5, 299.6; 350/350 S, 350 R, 351; 260/465 D, 465 R, 455 R; 558/257

[56] References Cited

U.S. PATENT DOCUMENTS

| | | | |
|---|---|---|---|
| 4,112,239 | 9/1978 | Dubois et al. | 252/299.65 |
| 4,137,250 | 1/1979 | Reynolds | 252/299.67 |
| 4,162,988 | 7/1979 | Maze et al. | 252/299.67 |
| 4,196,974 | 4/1980 | Hareng et al. | 350/351 |
| 4,202,010 | 5/1980 | Hareng et al. | 350/351 |
| 4,202,791 | 5/1980 | Sato et al. | 252/299.5 |
| 4,219,255 | 8/1980 | Raynes | 350/350 S |
| 4,402,855 | 9/1983 | Zann et al. | 350/350 S |
| 4,410,445 | 10/1983 | Baur et al. | 252/299.63 |
| 4,464,020 | 8/1984 | Le Berre et al. | 252/299.66 |
| 4,514,045 | 4/1985 | Huffman et al. | 252/299.61 |

FOREIGN PATENT DOCUMENTS

| | | | |
|---|---|---|---|
| 65397 | 11/1982 | European Pat. Off. | 252/299.66 |
| 2603293 | 8/1977 | Fed. Rep. of Germany | 252/299.65 |
| 56-108761 | 8/1981 | Japan | 252/299.67 |

OTHER PUBLICATIONS

Neubert, M. E., et al., Mol. Cryst. Liq. Cryst., vol. 76, pp. 43-77 (1981).
Kim, Y. B., et al., Mol. Cryst. Liq. Cryst., vol. 36, pp. 293-306 (1976).
Reynolds, R. M., et al., Mol. Cryst. Liq. Cryst., vol. 36, pp. 41-50 (1976).
Deutscher, H. J., et al., J. Prakt. Chem., vol. 320, p. 191 (1978).

Primary Examiner—Teddy S. Gron
Attorney, Agent, or Firm—Antonelli, Terry & Wands

[57] ABSTRACT

A liquid crystal compound of the formula: $R_2$—$X_1$—$Y_1$—C(O)S—$Y_2$—Z, wherein $R_2$ is preferably $C_{7-14}$ alkyl; $X_1$ is —COO— or —OCO—;

$Y_1$ is 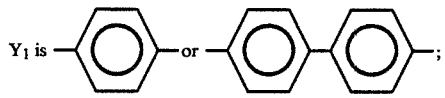

$Y_2$ is 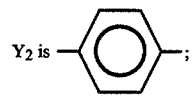

and Z is —$NO_2$ or —CN, shows a smectic phase, is large in positive delectric anisotropy and can give a liquid crystal composition suitable for use in a thermal address display device.

18 Claims, 4 Drawing Figures

LIQUID CRYSTAL COMPOUND AND LIQUID CRYSTAL COMPOSITION INCLUDING THE SAME

BACKGROUND OF THE INVENTION

This invention relates to a thioester type liquid crystal compound, a liquid crystal composition including the same and a liquid crystal display device including the liquid crystal composition.

Heretofore, various display principles have been applied to electrooptical display devices using liquid crystals and practical liquid crystal display devices have already been available commercially. Among them, TN type liquid crystal display devices using nematic liquid crystals with twisted alignment have widely been used in wrist watches, table-type electric computers, etc.

Recently, it is noticed that smectic liquid crystals show a light scattering phenomenon similar to the dynamic light scattering phenomenon of nematic liquid crystals and a display method applying the thermal and electrooptical effect is proposed. Such a liquid crystal display method is noticed as having memory function (e.g. U.S. Pat. No. 4,202,010).

According to such a method, when a liquid crystal layer is changed from a smectic phase to an isotropic liquid phase by heating an appropriate portion, there takes place an optically scattered state at the appropriate portion by subsequent rapid cooling. On the other hand, the non-heated portion of liquid crystal layer remains transparent due to the maintenance of uniform arranged structure. Thus, writing of images is conducted by forming scattering points in the transparent substrate. Further, selective erasure of a part of recorded image can be conducted as follows. That is, when an electric field is applied with higher than a certain value to the liquid crystal phase obtained by heating the smectic phase to the isotropic phase, the liquid crystal phase returns to the arranged smectic phase which is transparent. The transition from the smectic phase with a scattered structure to the smectic phase with an arranged structure can also be attained by applying a by far higher electric field than that mentioned above without heating.

But it is very important to drive even such a thermal address display element using smectic liquid crystals with a low voltage and a low power. Therefore, it has been required to find out liquid crystals and liquid crystal compositions satisfying such a requirement.

Generally speaking, in order to lower the threshold voltage (Vth) of a liquid crystal corresponding to an operation voltage of a liquid crystal display device, it is necessary to enlarge the dielectric anisotropy ($\Delta\epsilon$). Among known smectic liquid crystal, the compounds of the formulae:

  (I)

and

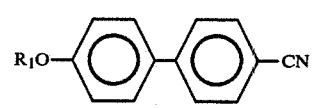  (II)

wherein $R_1$ is an alkyl group having 8 to 12 carbon atoms, have relatively large positive dielectric anisotropy. But even such biphenyl type liquid crystal compounds are still insufficient in the dielectric anisotropy.

SUMMARY OF THE INVENTION

This invention provides a liquid crystal compound of the formula:

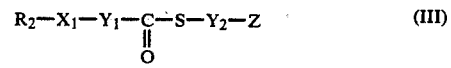  (III)

wherein $R_2$ is an alkyl group; $X_1$ is a group of the formula: —COO— or —OCO—; $Y_1$ is a group of the formula:

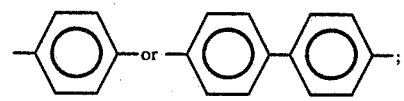

$Y_2$ is a group of the formula

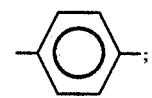

and Z is a nitro (—NO$_2$) group or a cyano (—CN) group.

This invention also provide a liquid crystal composition comprising a compound of the formula:

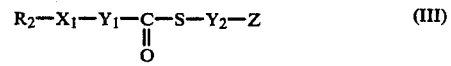  (III)

wherein $R_2$, $X_1$, $Y_1$, $Y_2$ and Z are as defined above and at least one compound selected from the group consisting of a compound of the formula:

  (I)

wherein $R_1$ is an alkyl group having 8 to 12 carbon atoms, a compound of the formula:

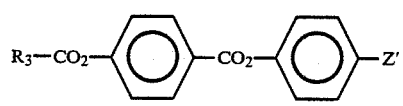  (IV)

wherein $R_3$ is an alkyl group having 8 to 13 carbon atoms; and Z' is a nitro group, a cyano group, or a fluorine atom, and a compound of the formula:

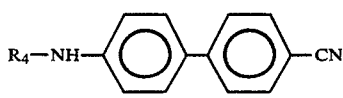
(V)

wherein $R_4$ is an alkyl group having 8 to 13 carbon atoms.

This invention further provides a liquid crystal display device comprising a liquid crystal layer between a pair of counter posed electrode substrates, the liquid crystal layer being optically modulated by applying an electric potential between the electrode substrates and formed by a liquid crystal composition comprising a compound of the formula:

$$R_2-X_1-Y_1-\overset{\overset{O}{\|}}{C}-S-Y_2-Z \quad (III)$$

wherein $R_2$, $X_1$, $Y_1$, $Y_2$ and Z are as defined above and at least one compound selected from the group consisting of a compound of the formula:

(I)

wherein $R_1$ is as defined above, a compound of the formula:

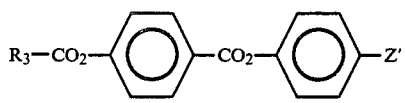
(IV)

wherein $R_3$ and $Z'$ are as defined above, and a compound of the formula:

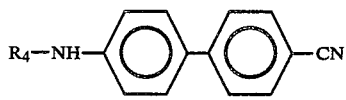
(V)

wherein $R_4$ is as defined above.

DESCRIPTION OF THE PREFERRED EMBODIMENTS

Figure 1:
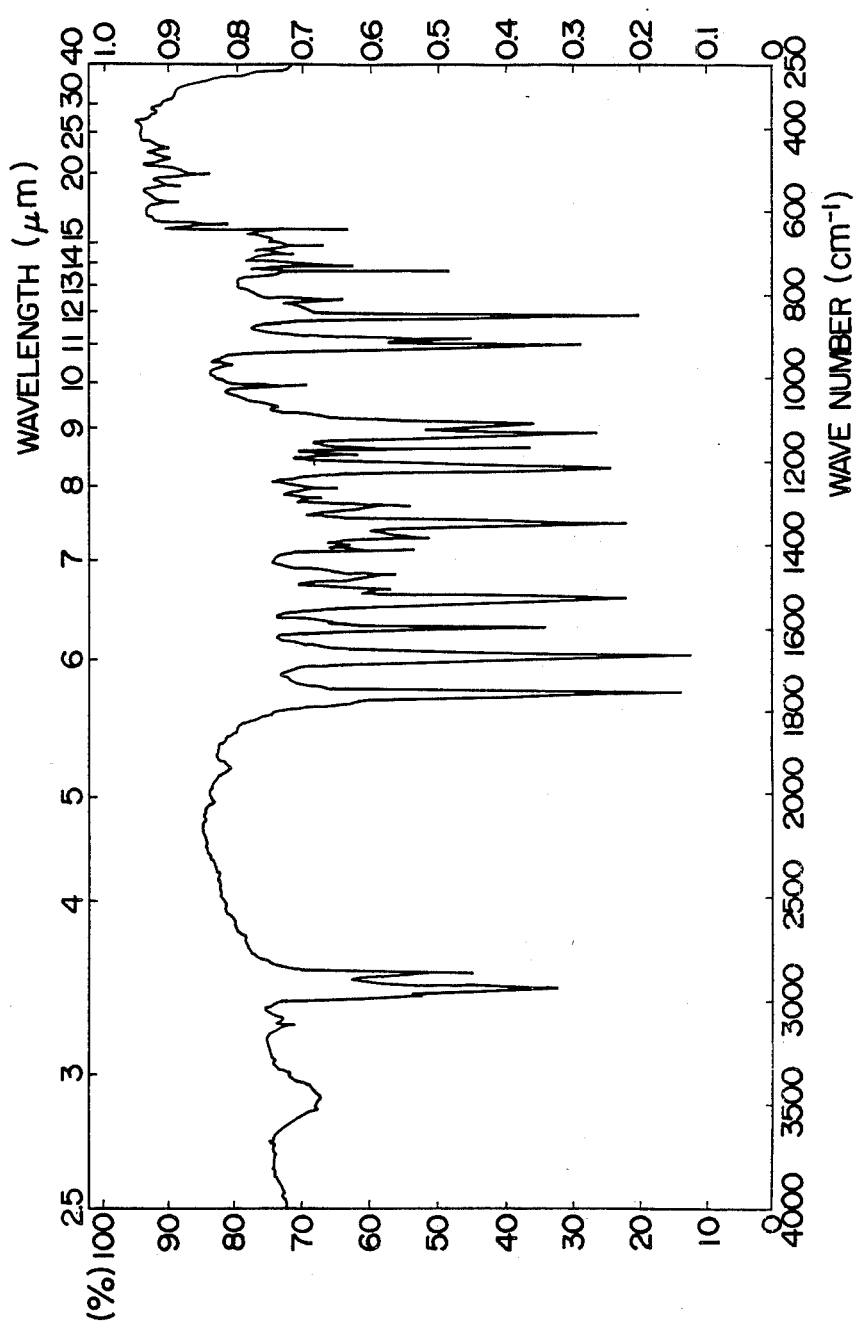
FIGS. 1 and 2 are infrared absorption spectra of examples of liquid crystal compounds of this invention.

The liquid crystal compound of this invention is represented by the formula:

$$R_2-X_1-Y_1-\overset{\overset{O}{\|}}{C}-S-Y_1-Z \quad (III)$$

wherein $R_2$ is an alkyl group preferably having 2 to 14 carbon atoms more preferably 7 to 14 carbon atoms; $X_1$ is a group of the formula —COO— or —OCO—; $Y_1$ is a group of the formula:

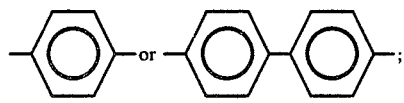

$Y_2$ is a group of the formula:

and Z is a nitro (—$NO_2$) group or a cyano (—CH) group.

Conventional liquid crystal compounds having benzene rings bonded directly to each other are small in dielectric anisotropy. According to the study of the present inventors, when two benzene rings are bonded via a thioester group

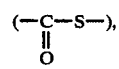

the resulting liquid crystal compounds become larger in dielectric anisotropy than the conventional liquid crystal compounds. But a liquid crystal compound of the formula:

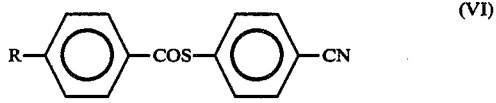
(VI)

wherein R is an alkyl group, is relatively large in the dielectric anisotropy, but is difficult to show the smectic phase.

In order to increase the dielectric anisotropy of smectic liquid crystal, thioester type liquid crystal compounds of the formula (III) were synthesized by the present inventors considering intermolecular force anisotropy of the molecular long-axis direction and the molecular short-axis direction and by bonding an acyloxy ($RCO_2$—) group having a large dipole moment dielectric constant at the molecular long-axis direction in place of an alkyl group or an alkoxy group as an terminal non-cyclic group and as another terminal non-cyclic group a nitro (—$NO_2$) group or a cyano (—CN) group.

The liquid crystal compounds of the formula (III) show the smectic phase and are large in positive dielectric anisotropy. When an acyloxy group is introduced to both non-cyclic terminal groups, smectic liquid crystals are easily obtained but low in the dielectric anisotropy. Therefore, in this invention, the acyloxy group is introduced only to one non-cyclic terminal group of thioester type liquid crystal compounds. Further, since the non-cyclic terminal groups are individually positioned at a para position with respect to a benzene ring, the resulting liquid crystal molecule becomes linear and can produce the smectic phase more easily. When the number of carbon atoms of the non-cyclic terminal acyloxy group is too large, for example more than 15, the formation of the smectic phase becomes difficult.

The liquid crystal compounds of the formula (III) include, for example, the following compounds of the formulae:

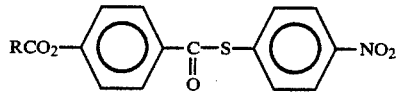
(VII)

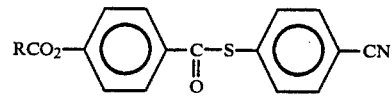
(VIII)

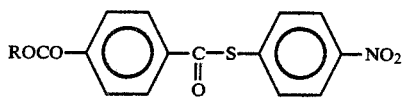
(IX)

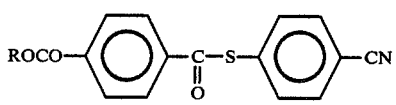
(X)

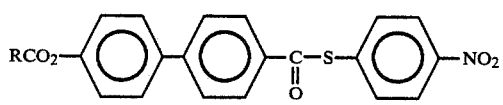
(XI)

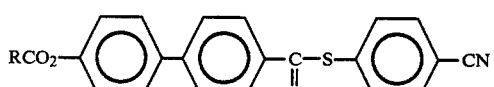
(XII)

These compounds can be produced as follows:

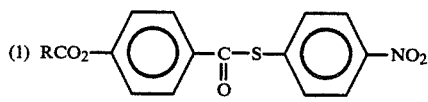
(1) (VII)

An acid chloride of RCOCl is condensed with

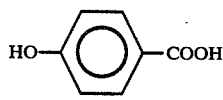

by the action of a base such as a mixed solution of benzene and pyridine to yield

is heated with thionyl chloride under reflux to yield an acid chloride. Excess thionyl chloride is removed completely by distillation under reduced pressure to yield an acid chloride of the formula:

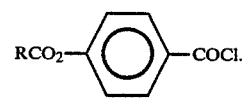

On the other hand, a cooled solution is prepared by dissolving

in, for example, pyridine in an amount sufficient for dissolving at room temperature, and then is reacted with the acid chloride in an inert solvent solution obtained above at room temperature by adding the latter dropwise with stirring. After the reaction, the reaction product is ice-cooled, poured into water, and the aqueous layer is separated. The resulting organic layer was washed with water to remove the pyridine salt. After removing the inert solvent by distillation, the product is purified by using, for example, a suitable recrystallization solvent such as ethanol to give colorless crystals of a compound of the formula:

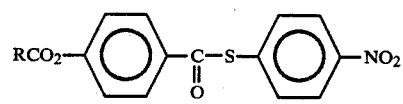
(VII)

Examples of the compounds of the formula (VII) are 4-propanoyloxythiolbenzoic acid-4'-nitrophenyl ester, 4-butanoyloxythiolbenzoic acid-4'-nitrophenyl ester [88°≃92° C. nematic liquid crystal: N=nematic phase], 4-pentanoyloxythiolbenzoic acid-4'-nitrophenyl ester [m.p. 85° C., (83° C.$^\text{N}$) monotropic nematic liquid crystal], 4-hexanoyloxythiolbenzoic acid-4'-nitrophenyl ester, 4-heptanoyloxythiolbenzoic acid-4'-nitrophenyl ester [73°≃86° C. nematic liquid crystal], 4-octanoyloxythiolbenzoic acid-4'-nitrophenyl ester [73°≃82° C. (59° C.$^\text{S}$), $\Delta\epsilon=18$], 4-decanoyloxythiolbenzoic acid-4'-nitrophenyl ester [83°≃87° C. smectic liquid crystal; 87°≃88° C. nematic liquid crystal: S=smectic phase], 4-undecanoyloxythiolbenzoic acid-4'-nitrophenyl ester [80°≃90° C. smectic liquid crystal], 4-tridecanoyloxythiolbenzoic acid-4'-nitrophenyl ester, 4-pentadecanoyloxythiolbenzoic acid-4'-nitrophenyl ester, etc.

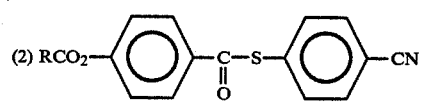
(2) (VIII)

An acid chloride of RCOCl is condensed with

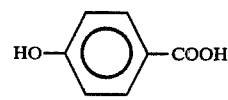

by the action of a base such as a mixed solution of benzene and pyridine to yield

This compound is reacted with thionyl chloride with heating under reflux to yield an acid chloride. Excess thionyl chloride is removed completely by distillation under reduced pressure to yield an acid chloride of the formula:

On the other hand, a cooled solution is prepared by dissolving

in, for example, pyridine in an amount sufficient for dissolving at room temperature, and then is reacted with the acid chloride in an inert solvent solution obtained above at room temperature by adding the latter dropwise with stirring. After the reaction, the reaction product is ice cooled, poured into water, and the aqueous layer is separated, followed by the washing of the resulting organic layer with water to remove the pyridine salt. After removing the inert solvent by distillation, the product is purified by using, for example, a suitable recrystallization solvent such as ethanol to give colorless crystals of a compound of the formula:

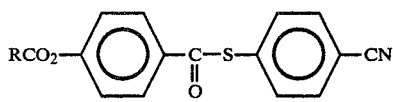
(VIII)

Examples of the compound of the formula (VIII) are
4-propanoyloxythiolbenzoic acid-4'-cyanophenyl ester,
4-butanoyloxythiolbenzoic acid-4'-cyanophenyl ester,
4-pentanoyloxythiolbenzoic acid-4'-cyanophenyl ester,
4-hexanoyloxythiolbenzoic acid-4'-cyanophenyl ester,
4-heptanoyloxythiolbenzoic acid-4'-cyanophenyl ester,
4-decanoyloxythiolbenzoic acid-4'-cyanophenyl ester
[77°≦90° C. smectic liquid crystal, 90°≦113° C. nematic liquid crystal],
4-undecanoyloxythiolbenzoic acid-4'-cyanophenyl ester
[80°≦109° C. smectic liquid crystal, 109°≦116° C. nematic liquid crystal],
4-dodecanoyloxythiolbenzoic acid-4'-cyanophenyl ester
[75°≦78° C. liquid crystal],
4-pentadecanoyloxythiolbenzoic acid-4'-cyanophenyl ester, etc.

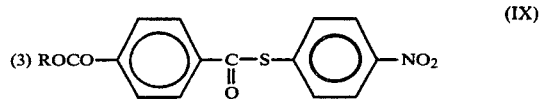
(3) (IX)

An alcohol of the formula: R—OH is condensed with ½ mole of

ClOC—⟨○⟩—COCl by the action of a base such as a mixed solution of benzene and pyridine to yield ROCO—⟨○⟩—COCl.

On the other hand, a cooled solution is prepared by dissolving

in pyridine in an amount sufficient for dissolving at room temperature, and then reacted with the acid chloride in an inert solvent solution obtained above at room temperature by adding the latter dropwise with stirring. After the reaction, the reaction product is ice cooled, poured into water, and the aqueous layer is separated, followed by washing of the resulting organic layer with water to remove the pyridine salt. After removing the inert solvent by distillation, the product is purified by using a suitable recrystallization solvent to give colorless crystals of a compound of the formula:

ROCO—⟨○⟩—C(=O)—S—⟨○⟩—NO₂
(IX)

Examples of the compounds of the formula (IX) are
4-propoxycarbonylthiolbenzoic acid-4'-nitrophenyl ester,
4-butoxycarbonylthiolbenzoic acid-4'-nitrophenyl ester,
4-pentoxycarbonylthiolbenzoic acid-4'-nitrophenyl ester,
4-hexyloxycarbonylthiolbenzoic acid-4'-nitrophenyl ester,
4-heptoxycarbonylthiolbenzoic acid-4'-nitrophenyl ester,
4-octoxycarbonylthiolbenzoic acid-4'-nitrophenyl ester,
4-nonyloxycarbonylthiolbenzoic acid-4'-nitrophenyl ester, etc.

(4) 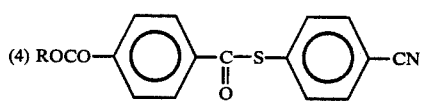 (X)

An alcohol of the formula: R—OH is condensed with ½ equivalent weight of

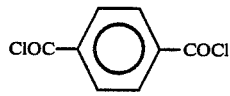

by the action of a base such as a mixed solution of benzene and pyridine to yield

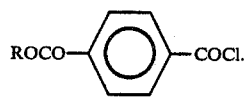

On the other hand, a cooled solution is prepared by dissolving

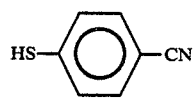

in pyridine in an amount sufficient for dissolving at room temperature, and then reacted with the acid chloride in an inert solvent solution obtained above at room temperature by adding the latter dropwise with stirring. After the reaction, the reaction product is ice cooled, poured into water, and the aqueous layer is separated, followed by washing of the resulting organic layer with water to remove the pyridine salt. After removing the inert solvent by distillation, the product is purified by using a suitable recrystallization solvent to give colorless crystals of a compound of the formula:

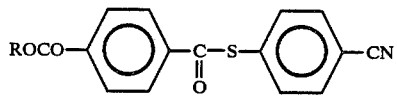 (X)

Examples of the compounds of the formula (X) are
4-propoxycarbonylthiolbenzoic acid-4'-cyanophenyl ester,
4-butoxycarbonylthiolbenzoic acid-4'-cyanophenyl ester,
4-pentoxycarbonylthiolbenzoic acid-4'-cyanophenyl ester,
4-hexyloxycarbonylthiolbenzoic acid-4'-cyanophenyl ester,
4-heptoxycarbonylthiolbenzoic acid-4'-cyanophenyl ester,
4-octoxycarbonylthiolbenzoic acid-4'-cyanophenyl ester,
4-nonyloxycarboxylthiolbenzoic acid-4'-cyanophenyl ester, etc.

(5) 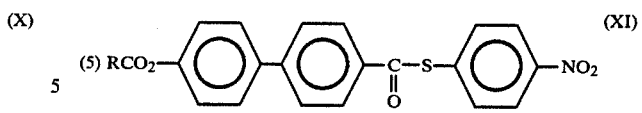 (XI)

An acid chloride of the formula: RCOCl is condensed with

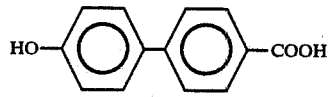

by the action of a base such as a mixed solution of benzene and pyridine to yield

This is reacted with thionyl chloride with heating under reflux to give an acid chloride. Excess thionyl chloride is removed completely by distillation under reduced pressure to yield an acid chloride of the formula:

On the other hand, a cooled solution is prepared by dissolving

in pyridine in an amount sufficient for dissolving at room temperature, and then reacted with the acid chloride in an inert solvent solution obtained above at room temperature by adding the latter dropwise with stirring. After the reaction, the reaction product is ice cooled, poured into water, and the aqueous layer is separated, followed by washing of the pyridine salt. After removing the inert solvent by distillation, the product is purified by using a suitable recrystallization solvent to give colorless crystals of a compound of the formula:

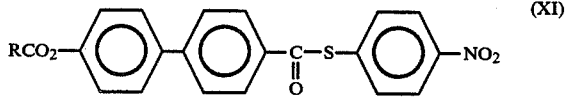 (XI)

Examples of the compounds of the formula (XI) are
4-propanoyloxy-4'-biphenylthiolcarboxylic acid-4-nitrophenyl ester,
4-butanoyloxy-4'-biphenylthiolcarboxylic acid-4-nitrophenyl ester,
4-pentanoyloxy-4'-biphenylthiolcarboxylic acid-4-nitrophenyl ester,
4-hexanoyloxy-4'-biphenylthiolcarboxylic acid-4-nitrophenyl ester, 4-heptanoyloxy-4'-biphenylthiolcarboxylic acid-4-nitrophenyl ester,
4-octanoyloxy-4'-biphenylthiolcarboxylic acid-4-nitrophenyl ester,
4-nonanoyloxy-4'-biphenylthiolcarboxylic acid-4-nitrophenyl ester,
4-decanoyloxy-4'-biphenylthiolcarboxylic acid-4-nitrophenyl ester, etc.

(6) 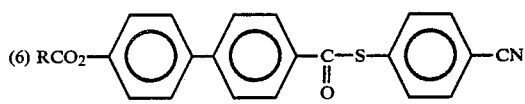 (XII)

An acid chloride of the formula: RCOCl is condensed with

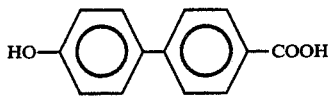

by the action of a base such as a mixed solution of benzene and pyridine to yield

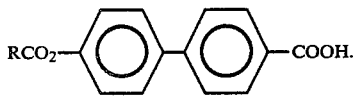

This is reacted with thionyl chloride with heating under reflux to give an acid chloride. Excess thionyl chloride is removed completely by distillation under reduced pressure to yield an acid chloride of the formula:

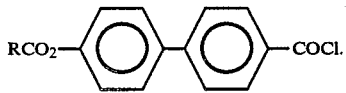

On the other hand, a cooled solution is prepared by dissolving

in pyridine in an amount sufficient for dissolving at room temperature, and then reacted with the acid chloride in an inert solvent solution obtained above at room temperature by adding the latter dropwise with stirring. After the reaction, the reaction product is ice cooled, poured into water, and the aqueous layer is separated, followed by washing of the pyridine salt. After removing the inert solvent by distillation, the product is purified by using a suitable recrystallization solution to give colorless crystals of a compound of the formula:

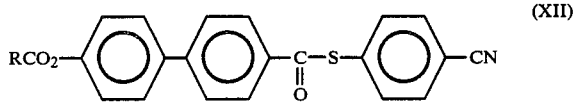 (XII)

Examples of the compounds of the formula (XII) are
4-propanoyloxy-4'-biphenylthiolcarboxylic acid-4-cyanophenyl ester,
4-butanoyloxy-4'-biphenylthiolcarboxylic acid-4-cyanophenyl ester,
4-pentanoyloxy-4'-biphenylthiolcarboxylic acid-4-cyanophenyl ester,
4-hexanoyloxy-4'-biphenylthiolcarboxylic acid-4-cyanophenyl ester,
4-heptanoyloxy-4'-biphenylthiolcarboxylic acid-4-cyanophenyl ester,
4-octanoyloxy-4'-biphenylthiolcarboxylic acid-4-cyanophenyl ester,
4-nonanoyloxy-4'-biphenylthiolcarboxylic acid-4'-cyanophenyl ester,
4-decanoyloxy-4'-biphenylthiolcarboxylic acid-4-cyanophenyl ester, etc.

The liquid crystal composition of this invention comprises a compound of the formula (III) and a compound of the formula (I) so that the resulting liquid crystal composition exhibits the desirable effects.

Examples of the compounds of the formula (I) are 4-octyl-4'-cyanobiphenyl, 4-nonyl-4'-cyanobiphenyl, 4-decyl-4'-cyanobiphenyl, 4-undecyl-4'-cyanobiphenyl, 4-dodecyl-4'-cyanobiphenyl, etc.

These compounds can be used alone or as a mixture thereof. Considering the temperature range showing a liquid crystal phase, the use of 4-octyl-4'-cyanobiphenyl is preferable. The compound of the formula (III) can be used alone or as a mixture thereof.

The liquid crystal composition preferably comprises 30 to 80 parts by weight of the compound of the formula (I) and 20 to 70 parts by weight of the compound of the formula (III). If the amount of the compound of the formula (III) is too small, the effect for enlarging the dielectric anisotropy ($\Delta\epsilon$) is insufficient, while if the amount of the compound of the formula (III) is too large, the temperature range showing the smectic phase is undesirably shifted to a higher temperature side.

The liquid crystal composition of this invention may also comprises a compound of the formula (III), a compound of the formula (I) and a compound of the formula:

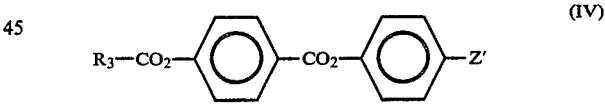 (IV)

wherein $R_3$ is an alkyl group having 8 to 13 carbon atoms; and Z' is a nitro group, a cyano group, or a fluorine atom, and/or at least one compound of the formula:

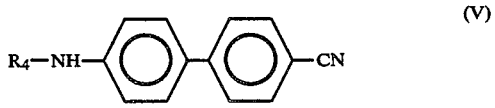 (V)

wherein $R_4$ is an alkyl group having 8 to 13 carbon atoms.

Examples of the compounds of the formula (IV) are
4-nonanoyloxybenzoic acid-4'-nitrophenyl ester,
4-nonanoyloxybenzoic acid-4'-fluorophenyl ester,
4-decanoyloxybenzoic acid-4'-nitrophenyl ester,
4-undecanoyloxybenzoic acid-4'-nitrophenyl ester,
4-undecanoyloxybenzoic acid-4'-cyanophenyl ester,
4-dodecanoyloxybenzoic acid-4'-nitrophenyl ester, 4-tridecanoyloxybenzoic acid-4'-nitrophenyl ester,
4-tetradecanoyloxybenzoic acid-4'-nitrophenyl ester,
4-nonanoyloxybenzoic acid-4'-cyanophenyl ester,
4-decanoyloxybenzoic acid-4'-cyanophenyl ester,
4-decanoyloxybenzoic acid-4'-fluorophenyl ester,
4-undecanoyloxybenzoic acid-4'-fluorophenyl ester,
4-dodecanoyloxybenzoic acid-4'-cyanophenyl ester, etc.

Examples of the compounds of the formula (V) are 4-octamino-4'-cyanobiphenyl, 4-nonylamino-4'-cyanobiphenyl, 4-decylamino-4'-cyanobiphenyl, 4-undecylamino-4'-cyanobiphenyl, 4-dodecylamino-4'-cyanobiphenyl, 4-tridecylamino-4'-cyanobiphenyl, etc.

When a part of the compound of the formula (III) is replaced by the compound of the formula (IV), it is preferable to use the compound of the formula (IV) in an amount of 50 parts by weight or less. By the addition of the compound of the formula (IV), the mesomorphic range can further be enlarged.

When a part of the compound of the formula (III) is replaced by the compound of the formula (V), it is preferable to use the compound of the formula (V) in an amount of 20 parts by weight or less. By the addition of the compound of the formula (V), the mesomorphic range can further be enlarged.

Further, in the liquid crystal composition comprising at least one compound of the formula (I), at least one compound of the formula (III), at least one compound of the formula (IV) and at least one compound of the formula (V), the compound of the formula (I) is used in an amount of 30 to 80 parts by weight and the total of the compounds of the formulae (III), (IV) and (V) is in an amount of 70 to 20 parts by weight, wherein the maximum amount of the compound of the formula (IV) is 50 parts by weight, and the maximum amount of the compound of the formula (V) is 20 parts by weight. In some cases, the use of the compound of the formula (III) may be omitted, when the compounds of the formulae (I), (IV) and (V) are used together.

In addition, the liquid crystal composition of this invention may omit the compound of the formula (I), and comprises at least one compound of the formula (III) and the compound of the formula (IV) in amounts of 20 to 80 parts by weight of the former and 80 to 20 parts by weight of the latter.

Figure 3:
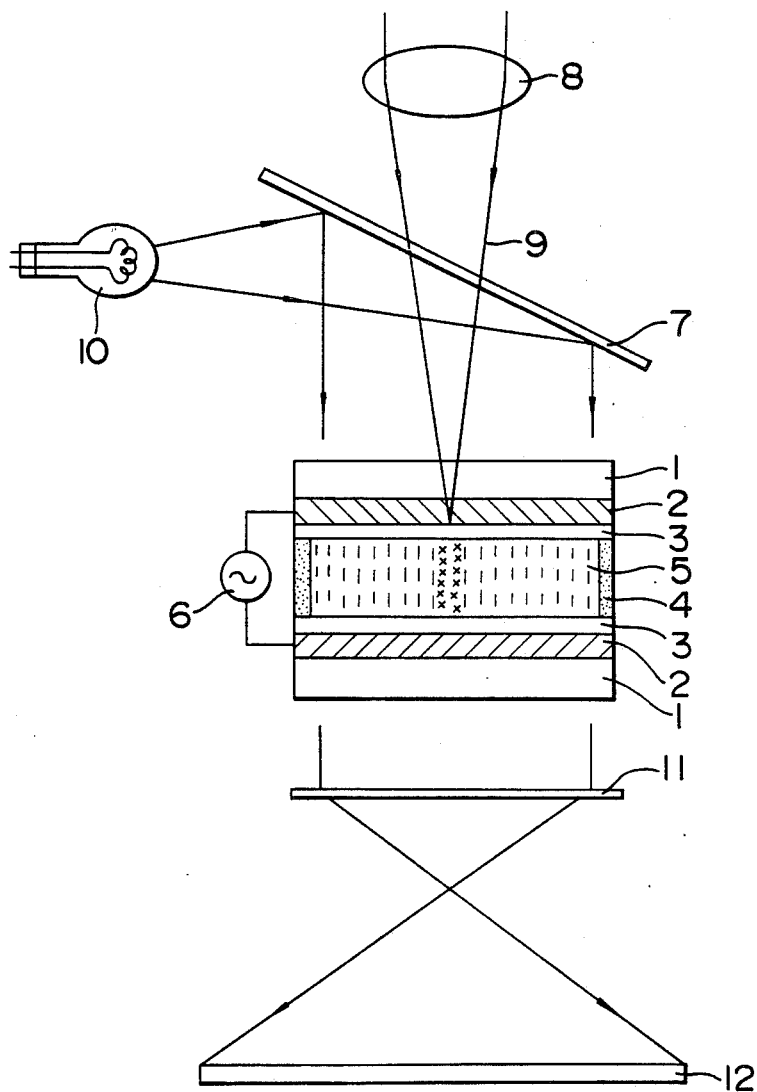
FIG. 3 is a diagrammatic view of an example of a thermal address liquid crystal display device using the liquid crystal composition of this invention.
Figure 4:
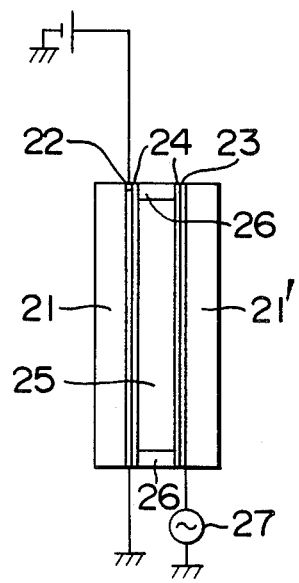
FIG. 4 is a diagrammatic view of another example of a thermal address liquid crystal display device using the liquid crystal composition of this invention.

The liquid crystal composition of this invention can be used in a liquid crystal layer in a liquid crystal display device as shown in FIG. 3 or 4. The liquid crystal layer can be heated by a heat electrode of Al, Cr or the like, or can effectively be heated by a laser. Further, the liquid crystal layer can be heated by any conventional heating means used in display methods applying thermooptical effects of smectic liquid crystals.

The liquid crystal composition of this invention may further comprises one or more of dichroic dyes, near infrared absorption dyes which can well absorb a laser light. Further, the liquid crystal composition of this invention may further contain one or more conventional additives used in smectic liquid crystal compositions.

FIG. 4 is a diagrammatic view of one example of a liquid crystal display device, wherein numerals 21 and 21' are glass substrates, numeral 22 a heating electrode (made of Cr), numeral 23 a transparent electrode (made of indium-tin-oxide (ITO)), numeral 24 an orientation controlling film, numeral 25 a smectic liquid crystal composition, numeral 26 a sealing agent (an epoxy resin), and numeral 27 an alternating current.

According to this invention, the threshold value of voltage to be applied for transition of from the smectic phase of a scattered structure to the smectic phase of an arranged structure can be reduced.

This invention is illustrated by way of the following Examples, in which all parts and percents are by weight unless otherwise specified.

EXAMPLE 1

Production and Properties of

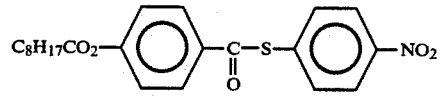

p-Hydroxybenzoic acid in an amount of 13.8 g (0.1 mole) was suspended in a mixed solution of benzene and pyridine (benzene:pyridine = 10:0.1 by weight, hereinafter the same one being used) with ice cooling. Then, 21.3 g (0.12 mole) of nonanoyl chloride was added dropwise thereto at a temperature of 10° C. or lower. After the dropwise addition, the resulting mixture was aged at 15° C. for 4 hours. Then, the benzene and pyridine were removed by distillation, followed by washing with water. After the washing with water, ether was added, and the resulting mixture was washed with water, and dried over $K_2CO_3$. After removing the ether by distillation, the residual crystalline material was recrystallized from ethanol to give colorless crystals of

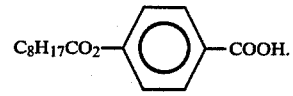

Then, 27.8 g (0.1 mole) of

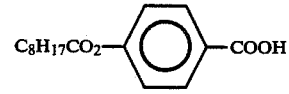

was dissolved in 50 ml of benzene. The resulting solution was cooled in ice water and excess thionyl chloride in an amount of 23.8 g (0.2 mole) was added thereto, followed by reflux in an oil bath of 60°–70° C. for 3 hours. Then, the excess thionyl chloride was removed by distillation, followed by distillation to give

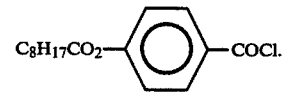

Further, 15.5 g (0.1 mole) of p-nitrobenzenethiol was cooled with ice while suspended in a mixed solution of benzene and pyridine, followed by dropwise addition of 35.6 g (0.12 mole) of the previously synthesized

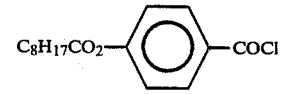

at a temperature of 10° C. or lower. Then, the resulting mixture was aged at 15° C. for 4 hours. After the aging, the benzene and pyridine were removed by distillation under reduced pressure, followed by washing with water. Then, ether was added thereto, washing with water was conducted. After being dried over K₂CO₃, the ether was removed by distillation and the residual crystalline material was recrystallized from ethanol to yield colorless crystals of

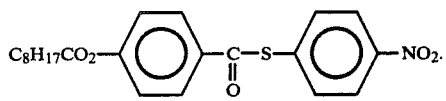

The resulting product, i.e. 4-nonanoyloxythiolbenzoic acid-4'-nitrophenyl ester (hereinafter referred to as "8 TAN") was a liquid crystalline compound showing a smectic liquid crystal state at 70°≦88° C. and a nematic liquid crystal state at 88°≦98° C. This compound had the following elementary analysis values and an infrared spectrum as shown in FIG. 1.

|  | C (%) | H (%) | N (%) | S (%) |
|---|---|---|---|---|
| Found | 63.56 | 6.08 | 3.35 | 7.75 |
| Calcd. for C₂₂H₂₅N₁O₅S₁ | 63.59 | 6.06 | 3.37 | 7.73 |

EXAMPLE 2

Production and Properties of

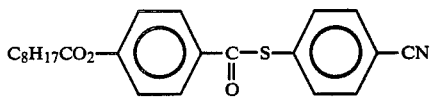

p-Hydroxybenzoic acid in an amount of 13.8 g (0.1 mole) was ice cooled while suspended in a mixed solution of benzene and pyridine, followed by dropwise addition of nonanoyl chloride in an amount of 21.3 g (0.12 mole) at 10° C. or lower. Then, the resulting mixture was aged at 15° C. for 4 hours. After aging, the benzene and pyridine were removed by distillation, followed by washing with water. Then, ether was added thereto, followed by washing with water and drying over K₂CO₃. After removing the ether by distillation, the residual crystalline material was recrystallized from ethanol to give colorless crystals of

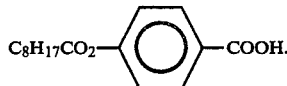

Then, 27.8 g (0.1 mole) of the above-mentioned

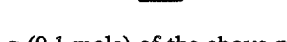

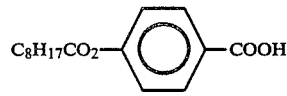

was dissolved in 50 ml of benzene. While cooling the resulting solution with ice, 23.8 g (0.2 mole) of excess thionyl chloride was added thereto and refluxed in an oil bath of 60°–70° C. for 3 hours. Then, the excess thionyl chloride was removed by distillation, followed by distillation to give

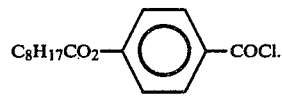

Further, 13.5 g (0.1 mole) of p-cyanobenzenethiol was ice cooled while suspended in a mixed solution of benzene and pyridine, followed by dropwise addition of 35.6 g (0.12 mole) of the previously synthesized

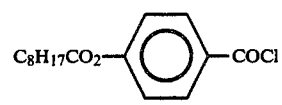

at 10° C. or lower. Then, the resulting mixture was aged at 15° C. for 4 hours. After aging, the benzene and pyridine were removed by distillation, followed by washing with water, drying over K₂CO₃ and removal of the ether by distillation. The residual crystalline material was recrystallized from ethanol to yield colorless crystals of

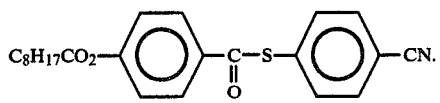

Figure 2:
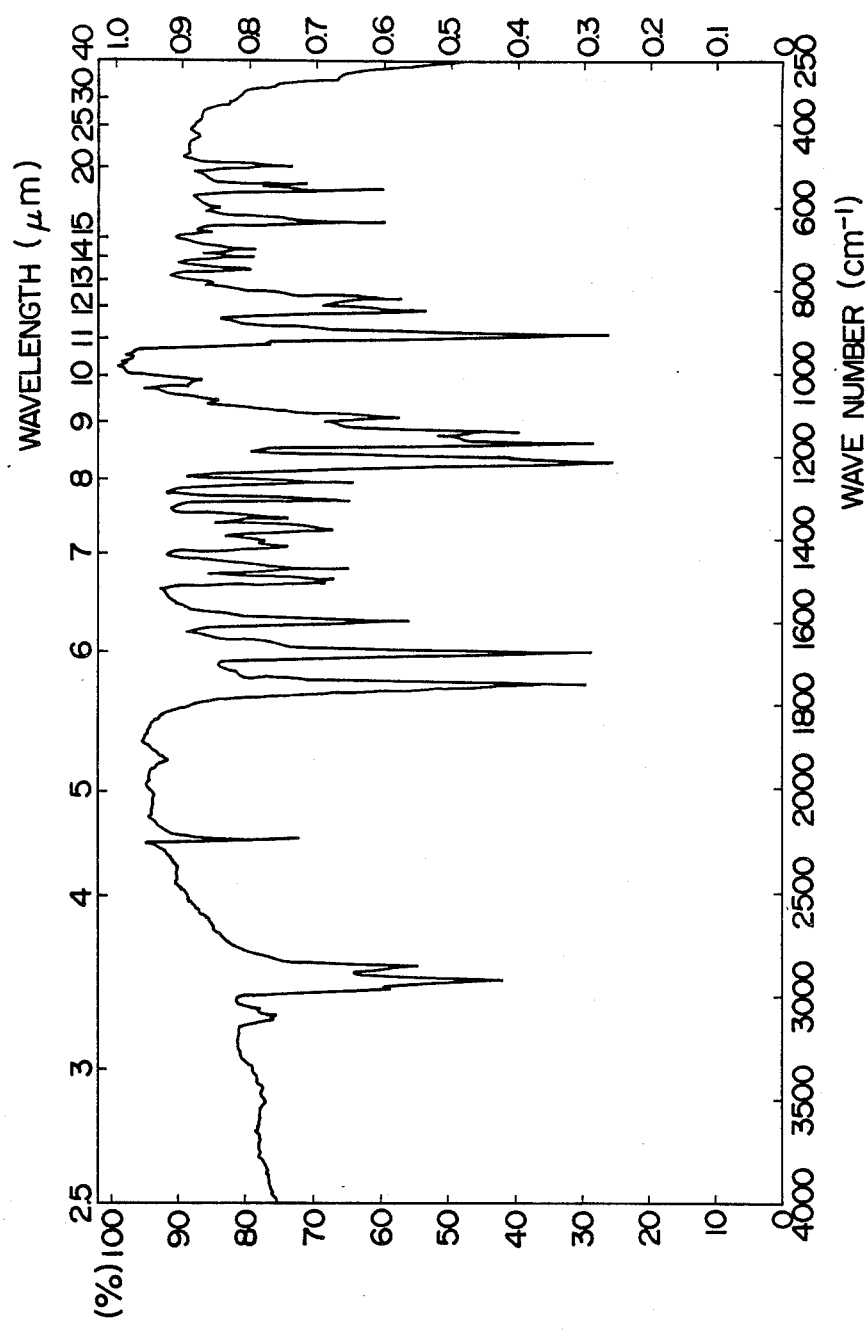

The resulting compound, i.e. 4-nonanoyloxythiolbenzoic acid-4'-cyanophenyl ester (hereinafter referred to as "8 TAC") was a liquid crystalline compound showing a smectic liquid crystal state at 71°≦73° C. and a nematic liquid crystal state at 73°≦118° C. This compound has the following elementary analysis values and an infrared absorption spectrum as shown in FIG. 2.

|  | C (%) | H (%) | N (%) | S (%) |
|---|---|---|---|---|
| Found | 69.83 | 6.39 | 3.50 | 8.14 |
| Calcd. for C₂₃H₂₅N₁O₃S₁ | 69.85 | 6.37 | 3.54 | 8.12 |

EXAMPLE 3

Production and Properties of

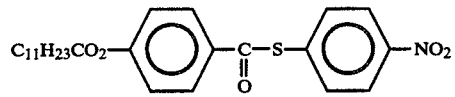

p-Hydroxybenzoic acid in an amount of 13.8 g (0.1 mole) was cooled with ice while suspended in a mixed solution of benzene and pyridine, followed by dropwise addition of 26.3 g (0.12 mole) of dodecanoyl chloride at 10° C. or lower. Then, the resulting mixture was aged at 15° C. for 4 hours. After aging, the benzene and pyridine were removed by distillation, followed by washing with water, addition of ether, washing with water, drying over K₂CO₃ and removal of the ether by distillation. The residual crystalline material was recrystallized from ethanol to yield colorless crystals of

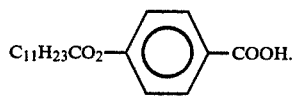

Then, 31.6 g (0.1 mole) of the above-mentioned

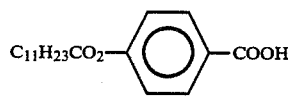

was dissolved in 50 ml of benzene. While cooling the resulting solution with ice, 23.8 g (0.2 mole) of excess thionyl chloride was added thereto and refluxed in an oil bath of 60°–70° C. for 3 hours. Then, the excess thionyl chloride was removed by distillation, followed by distillation to give

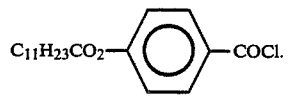

Further, 15.5 g (0.1 mole) of p-nitrobenzenethiol was cooled with ice while suspended in a mixed solution of benzene and pyridine, followed by dropwise addition of 40.6 g (0.12 mole) of the previously synthesized

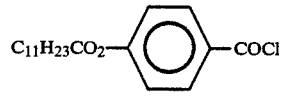

dissolved in benzene, at 10° C. or lower. Then, the resulting mixture was aged at 15° C. for 4 hours, followed by removal of the benzene and pyridine by distillation, washing with water, addition of ether, washing with water, drying over $K_2CO_3$ and removal of the ether. The residual crystalline material was recrystallized from ethanol to yield colorless crystals of

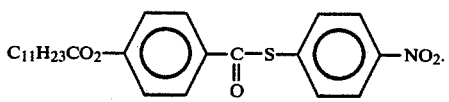

The resulting compound, i.e., 4-dodecanoyloxythiolbenzoic acid-4′-nitrophenyl ester (hereinafter referred to as "11 TAN") was a liquid crystalline compound showing a smectic liquid crystal state at 72°≦74° C. and no nematic liquid crystal state. This compound had the following elementary analysis values:

| | C (%) | H (%) | N (%) | S (%) |
|---|---|---|---|---|
| Found | 65.61 | 6.79 | 3.08 | 7.01 |
| Calcd. for $C_{25}H_{31}N_1O_5S_1$ | 65.63 | 6.78 | 3.06 | 7.02 |

EXAMPLE 4

Liquid crystal compositions were prepared by using as a matrix liquid crystal mixture a 1:1 mixture of

and 10%, 20% and 30% of 8 TAN and 8 TAC obtained in Examples 1 and 2. Phase transition temperatures and dielectric anisotropy were measured by a conventional method and shown in Table 1.

TABLE 1

| Run No. | Composition | Mixing ratio (%) | Phase transition temperatures (°C.) | Dielectric anisotropy (20° C.) |
|---|---|---|---|---|
| 1 | Matrix liquid crystal mixture $C_8H_{17}$—⟨⟩—⟨⟩—CN  $C_{10}H_{21}$—⟨⟩—⟨⟩—CN | 50  50 | $5.5 \overset{S}{—} 40 \overset{N}{—} 43$ | 7.4 |
| 2 | Matrix liquid crystal mixture + $C_8H_{17}CO_2$—⟨⟩—C(=O)—S—⟨⟩—$NO_2$ (8 TAN) | 10  20  30 | $3 \overset{S}{—} 46 \overset{S}{—} 49$  $4 \overset{S}{—} 49 \overset{N}{—} 52$  $4 \overset{S}{—} 52 \overset{N}{—} 56$ | 11.0  12.1  13.2 |

TABLE 1-continued

| Run No. | Composition | Mixing ratio (%) | Phase transition temperatures (°C.) | Dielectric anisotropy (20° C.) |
|---|---|---|---|---|
| 3 | Matrix liquid crystal mixture | 10 | $3\underset{}{\overset{S}{-}}44\underset{}{\overset{N}{-}}51$ | 10.8 |
| | + | 20 | $4\underset{}{\overset{S}{-}}46\underset{}{\overset{N}{-}}55$ | 11.9 |
| | 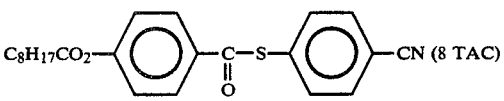 | 30 | $4\underset{}{\overset{S}{-}}48\underset{}{\overset{N}{-}}59$ | 12.8 |

Note
S: smectic phase
N: nematic phase

As is clear from Table 1, the compositions of Run Nos. 2 and 3, which belong to this invention, are broadened in the smectic liquid crystal phase and enlarged in the dielectric anisotropy. In contrast, the conventional biphenyl type liquid crystal mixture (Run No. 1) has a defect in that the dielectric anisotropy is not enlarged.

The liquid crystal composition of Run No. 2 (8 TAN content: 30%) shown in Table 1 was used for constituting a thermal address liquid crystal display element as shown in FIG. 3. In FIG. 3, numeral 1 denotes a glass substrate, numeral 2 a transparent electrode, numeral 3 an orientation film, numeral 4 a spacer, numeral 5 the liquid crystal composition (smectic liquid crystals), numeral 6 a source of electric voltage, numeral 7 a semi-transparent mirror, numeral 8 a converging lens, numeral 9 a laser light, numeral 10 a white lamp, numeral 11 a magnifying lens, and numeral 12 a screen.

The voltage for erasing the whole surface of the liquid crystal display element (gap 25 μm, laser power 72 μJ/dot) was able to be reduced to 45 V from 60 V of the conventional liquid crystal compositions.

EXAMPLE 5

A liquid crystal composition was prepared by mixing 20 parts of 4-nonanoyloxythiolbenzoic acid-4'-nitrophenyl ester obtained in Example 1 and 80 parts of 4-octyl-4'-cyanobiphenyl (K 24 manufactured by BDH Co., Ltd.). The liquid crystal composition showed a smectic phase at 14°-52° C. and a nematic phase at 52°-55° C.

A liquid crystal display element as shown in FIG. 4 was prepared by using a glass substrate 21 forming a heating electrode 22 made of Cr on one side thereof, and a glass substrate 21' forming a transparent electrode 23 for applying an electric field to a liquid crystal layer on one side thereof, with the liquid crystal layer of 10 μm thick. An orientation controlling film 24 was obtained by mixing perfluoroalkylalkoxysilane, silanol oligomer and polyetheramide and coating the resulting mixture with 80 nm thick. As a sealing agent 26, an epoxy resin mixed with glass fibers was used for controlling the thickness of the liquid crystal layer. Between the two glass substrates, the above-mentioned liquid crystal composition was sealed.

A direct current was passed through the heating electrode 22 for 2 msec and a light scattered state after heating the liquid crystal layer to an isotropic phase was evaluated by measuring the intensity when a light is irradiated from the transparent electrode side. The ratio of reflected light intensity of transparent state to that of light scattered state (contrast ratio) was 5.4.

Then, subsequent to the direct current being applied to the heating electrode 22, a voltage was applied between the heating electrode 22 and the transparent electrode 23. An applied voltage at the time of beginning to reduce the reflected light intensity at the light scattering state when the voltage was changed variously, that is, at the time of beginning to lower the contrast ratio was defined as a threshold value of erasing voltage. The threshold value of erasing voltage was 5 V.

COMPARATIVE EXAMPLE 1

A liquid crystal composition was prepared by mixing the following liquid crystal compounds in 1:1 by weight:

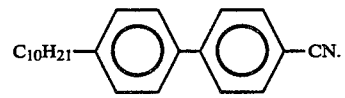

The liquid crystal composition was sealed in the same thermal address liquid crystal display element as shown in FIG. 4 in the same manner as described in Example 5.

The contrast ratio was 3.2 and the threshold valve of erasing voltage was 12 V.

EXAMPLE 6

A liquid crystal composition was prepared by mixing 60 parts of 4-octyl-4'-cyanobiphenyl, 30 parts of 4-nonanoyloxythiolbenzoic acid-4'-nitrophenyl ester and 10 parts of 4-nonanoyloxybenzoic acid-4'-fluorophenyl ester.

The liquid crystal composition was sealed in the same thermal address liquid crystal display element as shown in FIG. 4 in the same manner as described in Example 5.

The contrast ratio was 4.9 and the threshold valve of erasing voltage was 5 V.

EXAMPLE 7

A liquid crystal composition was prepared by mixing 60 parts of 4-octyl-4'-cyanobiphenyl, 20 parts of 4-undecanoyloxybenzoic acid-4'-cyanophenyl ester, and 20 parts of 4-octylamino-4'-cyanobiphenyl.

The liquid crystal composition was sealed in the same thermal address liquid crystal display element as shown in FIG. 4 in the same manner as described in Example 5.

The contrast ratio was 4.6 and the threshold value of erasing voltage was 6 V.

EXAMPLES 8–16

Liquid crystal compositions as listed in Table 2 were prepared.

The phase transition temperatures, the dielectric anisotropy ($\Delta\epsilon$), the contrast ratio and the threshold value of erasing voltage were measured and shown in Table 2.

TABLE 2

| Example No. | Liquid crystal composition | Mixing ratio (wt. %) | Phase transition temperatures (°C.) | $\Delta\epsilon$ | Contrast ratio | Threshold value |
|---|---|---|---|---|---|---|
| 8 | $C_8H_{17}$—⟨○⟩—⟨○⟩—CN | (1) (2)<br>74 32 | (1)<br>S<br>31~43~55 | 9<br>(20° C.) | — | — |
|  | $C_9H_{19}CO_2$—⟨○⟩—CS(=O)—⟨○⟩—CN | 26 68 | (2)<br>S   N<br>60~66~83 | 12<br>(45° C.) | — | — |
| 9 | $C_8H_{17}$—⟨○⟩—⟨○⟩—CN | 73 | S   N<br>38~45~49 | 9<br>(20° C.) | — | — |
|  | $C_9H_{19}CO_2$—⟨○⟩—CS(=O)—⟨○⟩—$NO_2$ | 27 |  |  |  |  |
| 10 | $C_8H_{17}$—⟨○⟩—⟨○⟩—CN | 52 | S   N<br>43~48~53 | 12<br>(20° C.) | — | — |
|  | $C_7H_{15}CO_2$—⟨○⟩—CS(=O)—⟨○⟩—$NO_2$ | 48 |  |  |  |  |
| 11 | $C_8H_{17}$—⟨○⟩—⟨○⟩—CN | 40 | S   N<br>14~49~53 | 11 | 4.9 | 4.5 V |
|  | $C_8H_{17}CO_2$—⟨○⟩—CO(=O)—⟨○⟩—$NO_2$ | 18 |  |  |  |  |
|  | $C_9H_{19}CO_2$—⟨○⟩—CO(=O)—⟨○⟩—$NO_2$ | 19 |  |  |  |  |
|  | $C_7H_{15}CO_2$—⟨○⟩—CS(=O)—⟨○⟩—$NO_2$ | 23 |  |  |  |  |
| 12 | $C_8H_{17}$—⟨○⟩—⟨○⟩—CN | 32 | S   N<br>32~59~67 | 13.5 | 4.2 | 4 V |

TABLE 2-continued

| Example No. | Liquid crystal composition | Mixing ratio (wt. %) | Phase transition temperatures (°C.) | Δε | Contrast ratio | Threshold value |
|---|---|---|---|---|---|---|
| | $C_8H_{17}CO_2$—⟨⟩—CO—⟨⟩—$NO_2$ | 15 | | | | |
| | $C_9H_{19}CO_2$—⟨⟩—CO—⟨⟩—$NO_2$ | 16 | | | | |
| | $C_7H_{15}CO_2$—⟨⟩—CS—⟨⟩—$NO_2$ | 19 | | | | |
| | $C_8H_{17}NH$—⟨⟩—⟨⟩—CN | 18 | | | | |
| 13 | $C_8H_{17}$—⟨⟩—⟨⟩—CN | 42 | S  N<br>35~52~58 | 13.3<br>(40° C.) | 4.5 | 3 V |
| | $C_7H_{15}CO_2$—⟨⟩—CS—⟨⟩—$NO_2$ | 19 | | | | |
| | $C_9H_{19}CO_2$—⟨⟩—CS—⟨⟩—$NO_2$ | 20.5 | | | | |
| | $C_8H_{17}NH$—⟨⟩—⟨⟩—CN | 18.5 | | | | |
| 14 | $C_8H_{17}NH$—⟨⟩—⟨⟩—CN | 51.5 | S  N<br>18~45~47 | 12<br>(25° C.) | 5.3 | 4 V |
| | $C_7H_{15}CO_2$—⟨⟩—CS—⟨⟩—$NO_2$ | 23.5 | | | | |
| | $C_9H_{19}CO_2$—⟨⟩—CS—⟨⟩—$NO_2$ | 25 | | | | |
| 15 | $C_7H_{15}CO_2$—⟨⟩—CS—⟨⟩—$NO_2$ | 24.6 | S  N<br>38~69~82 | 15<br>(45° C.) | — | — |
| | $C_9H_{19}CO_2$—⟨⟩—CS—⟨⟩—$NO_2$ | 26.3 | | | | |

TABLE 2-continued

| Example No. | Liquid crystal composition | Mixing ratio (wt. %) | Phase transition temperatures (°C.) | Δε | Contrast ratio | Threshold value |
|---|---|---|---|---|---|---|
| | C₉H₁₉CO₂—⟨⟩—CO—⟨⟩—CN | 24.1 | | | | |
| | C₁₀H₂₁CO₂—⟨⟩—CO—⟨⟩—CN | 25 | | | | |
| 16 | C₈H₁₇CO₂—⟨⟩—CO—⟨⟩—NO₂ | 39 | S N 39~67~80 | 15 (45° C.) | — | — |
| | C₉H₁₉CO₂—⟨⟩—CO—⟨⟩—NO₂ | 40.5 | | | | |
| | C₉H₁₉CO₂—⟨⟩—CS—⟨⟩—CN | 10 | | | | |
| | C₁₀H₂₁CO₂—⟨⟩—CS—⟨⟩—CN | 10.5 | | | | |

Note
S: smectic phase
N: nematic phase

As explained above, according to this invention, not only the threshold value of electric field applied to transferring from the smectic phase with a scattered structure to the smectic phase with an arranged structure can be reduced, but also the contrast ratio which is one of important features of display devices can be improved. Further, it is possible to broaden the oparable temperature range.

What is claimed is:
1. A liquid crystal composition, of smectic liquid crystals, comprising a compound of the formula:

$$R_2-X_1-Y_1-\underset{\underset{O}{\|}}{C}-S-Y_2-Z \quad (III)$$

wherein $R_2$ is an alkyl group having 7 to 14 carbon atoms; $X_1$ is a group of the formula: —COO— or —OCO—; $Y_1$ is a group of the formula:

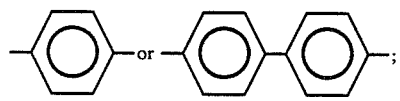

$Y_2$ is a group of the formula:

and Z is a nitro group or a cyano group, and at least one compound selected from the group consisting of a compound of the formula:

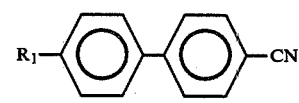

(I)

wherein $R_1$ is an alkyl group having 8 to 12 carbon atoms, a compound of the formula:

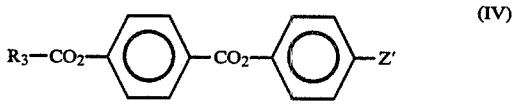

(IV)

wherein $R_3$ is an alkyl group having 8 to 13 carbon atoms; and Z' is a nitro group, a cyano group or a fluorine atom, and a compound of the formula:

(V)

wherein R₄ is an alkyl group having 8 to 13 carbon atoms, the total amount of the compounds of the formulae (III), (IV) and (V) being 70 to 20 parts by weight and the amount of the compound of the formula (I) being 30 to 80 parts by weight, with the exception that the amount of the compound of the formula (III) is 20 to 80 parts by weight and the amount of the compound of the formula (IV) is 80 to 20 parts by weight when the compounds of the formulae (I) and (IV) are not used, the total amount of the compound of formula (III) and the at least one compound selected from formulae (I), (IV), and (V) being 100 parts by weight.

2. A composition according to claim 1, which comprises a compound of the formula (III) in an amount of 20 to 70 parts by weight and a compound of the formula (I) in an amount of 30 to 80 parts by weight.

3. A composition according to claim 1, which comprises a compound of the formula (III), a compound of the formula (IV), and a compound of the formula (I), the total amount of the compounds of the formulae (III) and (IV) being 70 to 20 parts by weight and the amount of the compound of the formula (I) being 30 to 80 parts by weight, the total being 100 parts by weight.

4. A composition according to claim 1, which comprises a compound of the formula (III), a compound of the formula (V) and a compound of the formula (I), the total amount of the compounds of the formulae (III) and (V) being 70 to 20 parts by weight and the amount of the compound of the formula (I) being 30 to 80 parts by weight, the total being 100 parts by weight.

5. A composition according to claim 1, which comprises a compound of the formula (III), a compound of the formula (I), a compound of the formula (IV), and a compound of the formula (V), the total amount of the compounds of the formulae (III), (IV) and (V) being 70 to 20 parts by weight and the amount of the compound of the formula (I) being 30 to 80 parts by weight, the total being 100 parts by weight.

6. A composition according to claim 1, which comprises a compound of the formula (III), and a compound of the formula (IV), the amount of the compound of the formula (III) being 20 to 80 parts by weight and the amount of the compound of the formula (IV) being 80 to 20 parts by weight, the total being 100 parts by weight.

7. A liquid crystal display device comprising a crystal layer between a pair of counterposed electrode substrates, the liquid crystal layer being optically modulated by applying an electric potential between the electrode substrates and formed by a liquid crystal composition, of smectic liquid crystals, comprising a compound of the formula:

$$R_2-X_1-Y_1-\underset{\underset{O}{\|}}{C}-S-Y_2-Z \quad (III)$$

wherein $R_2$ is an alkyl group having 7 to 14 carbon atoms; $X_1$ is a group of the formula: —COO— or —OCO—; $Y_1$ is a group of the formula:

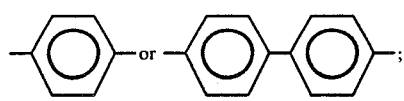

$Y_2$ is a group of the formula:

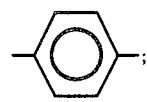

and Z is a nitro group of a cyano group, and at least one compound selected from the group consisting of a compound of the formula:

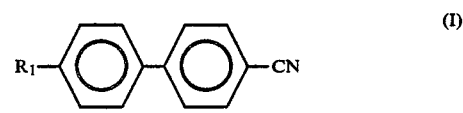
(I)

wherein $R_1$ is an alkyl group having 8 to 12 carbon atoms, a compound of the formula:

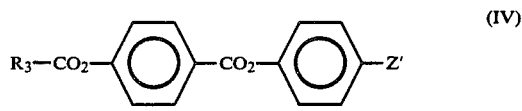
(IV)

wherein $R_3$ is an alkyl group having 8 to 13 carbon atoms; and Z' is a nitro group, a cyano group or a fluorine atom, and a compound of the formula:

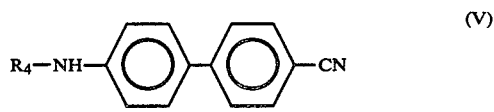
(V)

wherein $R_2$ is an alkyl group having 8 to 13 carbon atoms, the amount of the compound of the formula (I) being 30 to 80 parts by weight and the total amount of the compounds of the formulae (III), (IV) and (V) being 70 to 20 parts by weight, with the exception that the amount of the compound of the formula (III) is 20 to 80 parts by weight and the amount of the compound of the formula (IV) is 80 to 20 parts by weight when the compounds of the formulae (I) and (V) are not used, the total amount of the compound of formula (III) and the at least one compound selected from formulae (I), (IV) and (V) being 100 parts by weight.

8. A smectic liquid crystal compound of the formula:

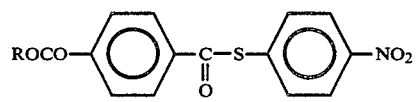

wherein R is an alkyl group having 7 to 14 carbon atoms.

9. A smectic liquid crystal compound of the formula:

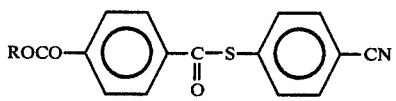

wherein R is an alkyl group having 7 to 14 carbon atoms.

10. A composition according to claim 2, which comprises

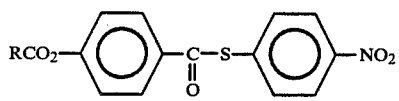

wherein R is an alkyl group having 7 to 14 carbon atoms, and

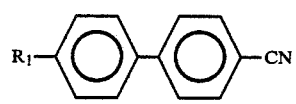

wherein $R_1$ is an alkyl group having 8 to 12 carbon atoms.

11. A composition according to claim 3, which comprises

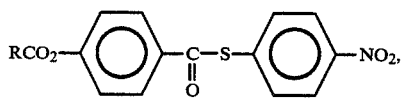

wherein R is an alkyl group having 7 to 14 carbon atoms,

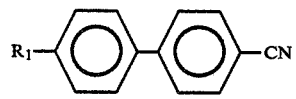

wherein $R_1$ is an alkyl group having 8 to 12 carbon atoms, and

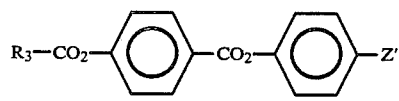

wherein $R_3$ is an alkyl group having 8 to 13 carbon atoms; and Z' is a nitro group, a cyano group or a fluorine atom.

12. A composition according to claim 1, wherein the compound of the formula (III) is

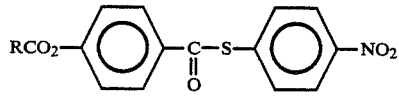

wherein R is an alkyl group having 7 to 14 carbon atoms.

13. A composition according to claim 4, wherein the compound of the formula (III) is

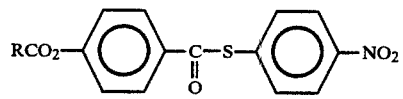

wherein R is an alkyl group having 7 to 14 carbon atoms.

14. A composition according to claim 5, wherein the compound of the formula (III) is

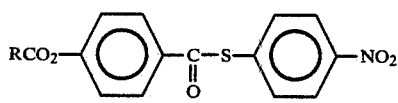

wherein R is an alkyl group having 7 to 14 carbon atoms.

15. A composition according to claim 2, wherein the compound of the formula (I) is a 1:1 mixture of

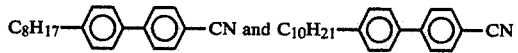

and the compound of the formula (III) is

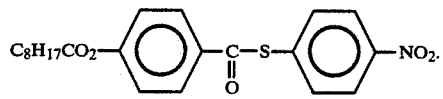

16. A composition according to claim 2, wherein the compound of the formula (I) is a 1:1 mixture of

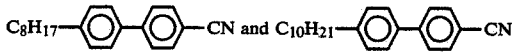

and the compound of the formula (III) is

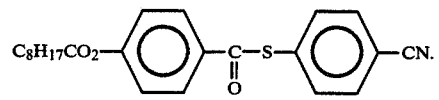

17. A composition according to claim 3, wherein the compound of the formula (I) is

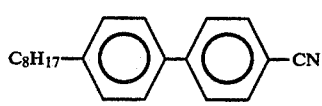

the compound of the formula (III) is

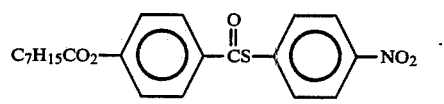

and the compound of the formula (IV) is

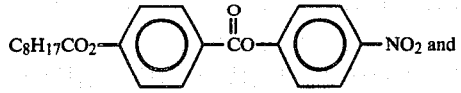
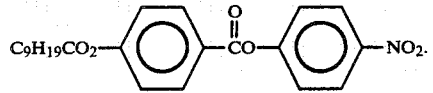
18. A composition according to claim 2, wherein the compound of the formula (I) is
and the compound of the formula (III) is
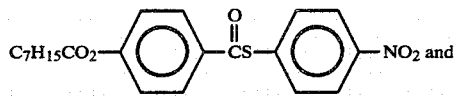
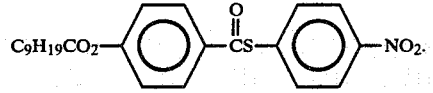
* * * * *